W. H. HEARD.
STRAINER.
APPLICATION FILED DEC. 31, 1907.
923,651.
Patented June 1, 1909.
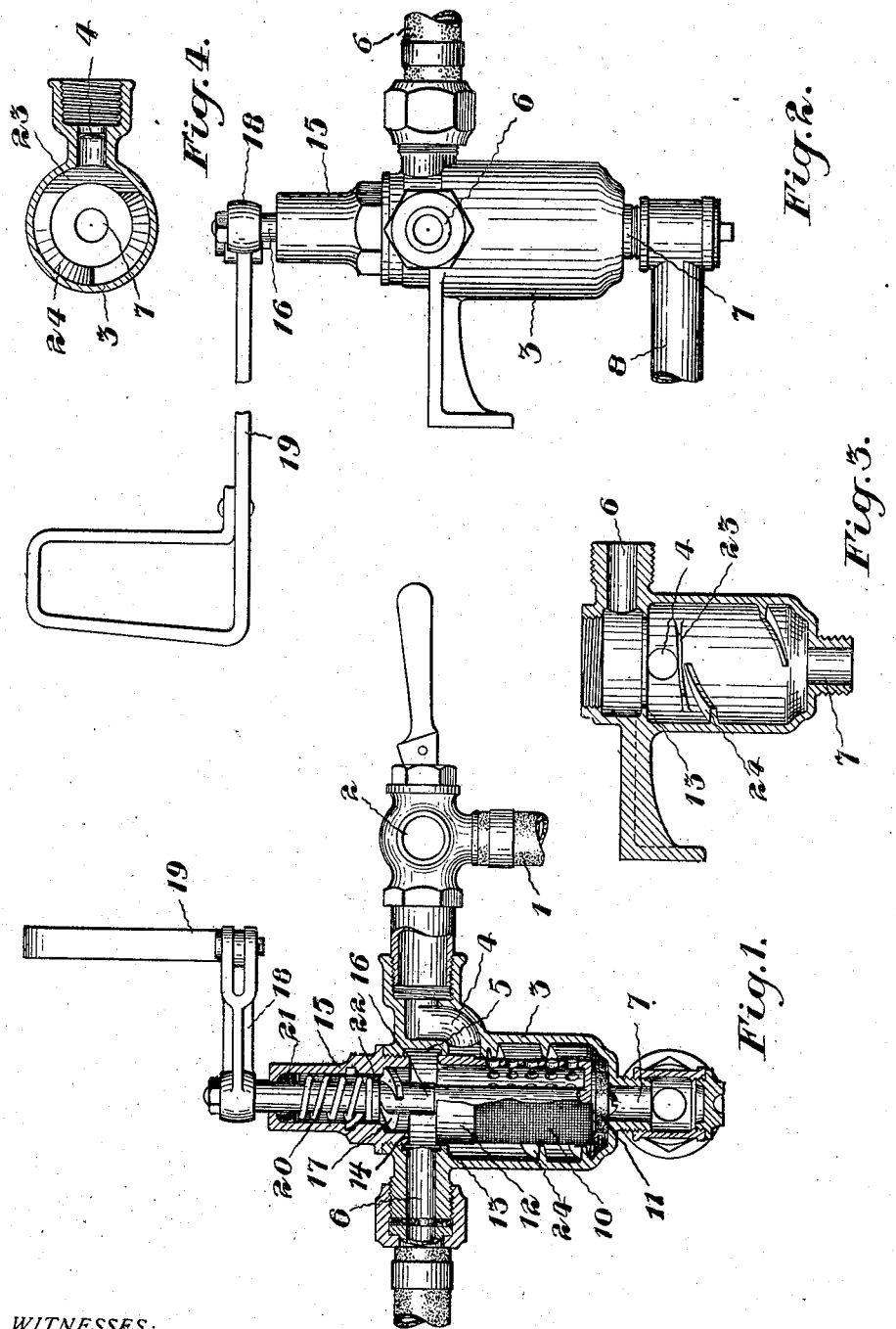
WITNESSES:
INVENTOR.
Wm. H. Heard
BY
ATTORNEYS

UNITED STATES PATENT OFFICE.

WILLIAM HENRY HEARD, OF LONDON, ONTARIO, CANADA.

STRAINER.

No. 923,651. Specification of Letters Patent. Patented June 1, 1909.

Application filed December 31, 1907. Serial No. 408,857.

*To all whom it may concern:*

Be it known that I, WILLIAM HENRY HEARD, of the city of London, in the Province of Ontario, Canada, have invented certain new and useful Improvements in Strainers, of which the following is a specification.

My object is to devise a straining device particularly adapted for use in spray pumps to protect the nozzles from clogging. Such a device in order to be practicable must not only strain effectively for considerable periods without cleaning but must be capable of being cleaned almost instantly without taking the device apart. I have fulfilled these requirements by a construction which may be briefly described as follows;—A casing is provided with an inlet, one of more outlets, and a sediment outlet. Within the casing is located a cylindrical strainer whose interior normally communicates with the outlets and whose lower end normally closes the sediment outlet. The ordinary course of the fluid is through the strainer to the outlets; by raising the cylindrical strainer the outlets may be cut off and the discharge takes place around the strainer, and through the sediment outlet, thus washing out accumulated sediment.

Figure 1 is a vertical longitudinal section of my improved strainer. Fig. 2 is an end view of the same looking from the left hand in Fig. 1. Fig. 3 is a vertical section of the casing of the strainer taken at right angles to Fig. 1. Fig. 4 is a section of the casing of the strainer taken at the level of the inlet.

In the drawings like numerals of reference indicate corresponding parts in the different figures.

1 is a pipe through which fluid is supplied to the strainer from any suitable pump. This pipe communicates by means of any suitable angle valve 2 with the interior of the strainer casing 3, the inlet 4 being jogged downwardly, as shown, leaving a partition 5 at the upper part thereof. With the interior of the upper part of the casing communicate one or more outlets 6.

In the bottom of the casing is formed a sediment outlet 7, with which is connected a pipe 8 which may be led wherever desired. In practice I prefer to lead the pipe back into the source of supply from which the fluid is being drawn.

Within the casing is located a hollow strainer 10 of any suitable construction, the exterior diameter of which is less than the interior diameter of the casing 3. The lower end of this strainer is provided with a suitable valve disk 11, adapted when the strainer is in the position shown in Fig. 1 to close the sediment outlet. The upper end of the strainer is formed with a blank ring 12, which fits closely an aperture formed in the diaphragm 13 dividing the outlets from the inlet of the casing. The casing being hollow, and open at its upper end, the normal course of the fluid passing through it is from the inlet through the perforations of the strainer into its interior, thence through its hollow interior to the outlets the blank ring preventing the fluid passing too directly to the outlet. If, however, the strainer be lifted until its upper end contacts with the seat 14, formed preferably on the under side of the bonnet 15 of the casing, all communication between the interior of the strainer and the outlets is cut off, as the blank ring closes the opening in the diaphragm 13 and the upper end of the strainer is closed by its contact with the seat 14. The fluid entering the strainer then washes around the exterior of the strainer and passes out through the sediment outlet, which has been opened by the raising of the valve disk 11 secured to the lower end of the strainer. Any collected sediment is thus washed off the strainer and passes away through the pipe 8.

For the purpose of lifting the strainer it is provided with a stem 16, which is provided with a coarse thread 17 engaging a similarly cut thread in the interior of the bonnet 15. The stem extends out through the bonnet and has a crank arm 18 secured thereto. To the outer end of this crank arm is pivoted a suitable pull 19. By drawing on this pull the stem may be rotated, and the stem and strainer rapidly lifted. Within the bonnet a coil spring 20 is placed about the stem 16. This spring engages the packing 21 at the upper end of the bonnet, and also engages a collar 22 on the stem. This spring thus not only serves to return the strainer to its normal position when the pull is released but also serves to keep the packing tight.

In order to secure a proper distribution of the fluid over the surface of the strainer I preferably provide the interior of the casing below the inlet 4 with a shelf 23 which runs about one third way around the internal periphery of the casing. (See Fig. 4). This distributes the fluid well around the upper end of the strainer, and to effect this further distribution I provide one or more ribs 24. These are preferably helically arranged, as shown in Figs. 1, 3 and 4 of the drawings, and contact with the external periphery of the strainer. These ribs not only serve to distribute the fluid but also have a still more important function, as when the strainer is raised and rotated by the rotation of the stem the whole of its surface is scraped against these ribs and the accumulated sediment loosened. Further, they also give the fluid a strong swirling action between the casing and the strainer which causes the fluid to effectively wash away the loosened sediment and carry it to the sediment outlet 7.

From the construction described it will be seen that the straining is very effective, and as the whole surface of the strainer is used considerable time will elapse before it can become so clogged as to seriously affect the flow of liquid through it. If it does become in any way clogged by drawing on the pull 19 and then releasing it the strainer will almost instantly be scraped clean, and the accumulated sediment washed away.

What I claim as my invention is—

1. In apparatus of the class described the combination of a casing having an inlet and an outlet; a hollow strainer therein normally having its exterior in free communication with the inlet and its interior with the outlet; a blank ring at the end of the strainer surface opposite the inlet; and a shelf on the interior of the casing below the inlet fitting close to the lower part of the blank ring and adapted to lead the entering fluid part way around the blank ring to the other side of the strainer.

2. In apparatus of the class described the combination of a casing having an inlet and an outlet; a hollow strainer therein normally having its exterior in free communication with the inlet and its interior with the outlet; a blank ring at the end of the strainer surface opposite the inlet; a shelf on the interior of the casing below the inlet fitting close to the lower part of the blank ring and adapted to lead the entering fluid part way around the blank ring to the other side of the strainer; and ribs on the interior of the casing adapted to distribute the entering fluid over the surface of the strainer.

3. In apparatus of the class described the combination of a casing having an inlet, an outlet, and a sediment outlet; a longitudinally movable hollow strainer therein normally having its exterior in free communication with the inlet and its interior with the outlet, the said strainer being adapted when in its normal position to close the sediment outlet and when lifted to close the outlet and open the sediment outlet.

4. In apparatus of the class described the combination of a casing having an inlet, an outlet, and a sediment outlet; a longitudinally movable hollow strainer therein normally having its exterior in free communication with the inlet and its interior with the outlet, the said strainer being adapted when in its normal position to close the sediment outlet and when lifted to close the outlet and open the sediment outlet; and a helical rib formed on the interior of the casing and contacting with the surface of the strainer.

5. In apparatus of the class described the combination of a casing having an inlet, an outlet, and a sediment outlet; a longitudinally movable and rotatable cylindrical strainer therein normally having its exterior in free communication with the inlet and its interior with the outlet, the said strainer being adapted when in its normal position to close the sediment outlet and when lifted to close the outlet and open the sediment outlet.

6. In apparatus of the class described the combination of a casing having an inlet, an outlet, and a sediment outlet; a longitudinally movable and rotatable cylindrical strainer therein normally having its exterior in free communication with the inlet and its interior with the outlet, the said strainer being adapted when in its normal position to close the sediment outlet and when lifted to close the outlet and open the sediment outlet; and a helical rib formed on the interior of the casing and contacting with the surface of the strainer.

7. In apparatus of the class described the combination of a casing having an inlet, an outlet, and a sediment outlet; a hollow strainer therein normally having its exterior in free communication with the inlet and its interior with the outlet; a stem on said strainer having a screw threaded engagement with the interior of the casing whereby the strainer may be raised or lowered by rotating said stem, the said strainer being adapted when in its normal position to close the sediment outlet and when lifted to close the outlet and open the sediment outlet.

8. In apparatus of the class described the combination of a casing having an inlet, an outlet, and a sediment outlet; a cylindrical strainer therein normally having its exterior in free communication with the inlet and its interior with the outlet; a stem on said strainer having a screw threaded engagement with the interior of the casing whereby the strainer may be raised or lowered by rotating said stem, the said strainer being adapted when in its normal position to close the sediment outlet and when lifted to close the outlet and open the sediment outlet; and a helical rib formed on the interior of the casing and contacting with the surface of the strainer.

9. In apparatus of the class described the combination of a casing having an inlet, an outlet, and a sediment outlet; a hollow strainer therein normally having its exterior in free communication with the inlet and its interior with the outlet; a stem on said strainer having a screw threaded engagement with the interior of the casing whereby the strainer may be raised or lowered by rotating said stem, the said strainer being adapted when in its normal position to close the sediment outlet and when lifted to close the outlet and open the sediment outlet; and a spring tending to maintain the casing in its normal position.

10. In apparatus of the class described the combination of a casing having an inlet, an outlet, and a sediment outlet; a cylindrical strainer therein normally having its exterior in free communication with the inlet and its interior with the outlet; a stem on said strainer having a screw threaded engagement with the interior of the casing whereby the strainer may be raised or lowered by rotating said stem, the said strainer being adapted when in its normal position to close the sediment outlet and when lifted to close the outlet and open the sediment outlet; a spring tending to maintain the casing in its normal position; and a helical rib formed on the interior of the casing and contacting with the surface of the strainer.

London, Ont., 12th Dec., 1907.

WILLIAM HENRY HEARD.

Signed in the presence of—
J. W. WINNETT,
R. E. WALKER.